United States Patent
Enzmann et al.

(10) Patent No.: US 8,447,024 B2
(45) Date of Patent: *May 21, 2013

(54) SYSTEMS AND METHODS FOR PROVIDING ENUM IN AN LNP ENVIRONMENT

(75) Inventors: Mark J. Enzmann, Roswell, GA (US); Robert T. Moton, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 219 days.

This patent is subject to a terminal disclaimer.

(21) Appl. No.: 12/628,107

(22) Filed: Nov. 30, 2009

(65) Prior Publication Data

US 2010/0074431 A1  Mar. 25, 2010

Related U.S. Application Data

(63) Continuation of application No. 10/971,026, filed on Oct. 25, 2004, now Pat. No. 7,627,108.

(51) Int. Cl.
*H04M 7/00* (2006.01)

(52) U.S. Cl.
USPC .................. 379/221.13; 379/221.14

(58) Field of Classification Search
USPC .......... 379/221.13, 221.14; 370/352
See application file for complete search history.

(56) References Cited

U.S. PATENT DOCUMENTS 6,865,266 B1 * 3/2005 Pershan ................... 379/221.13
7,701,883 B2 * 4/2010 Beckemeyer ............ 370/260

* cited by examiner

*Primary Examiner* — Amal Zenati
(74) *Attorney, Agent, or Firm* — Moazzam & Associates, LLC

(57) ABSTRACT

A system, computer-readable medium system, and method which provide a ENUM specification in an LNP environment where an originating device of a first service provider dials a dialed call for forwarding to a terminating device of a second service provider. There is provided a combined LNP and ENUM database having a central location which is in communication with both an originating office and a terminating office. Both the originating office and the terminating office can look up and use LNP and ENUM information from the combined database.

20 Claims, 6 Drawing Sheets

SYSTEMS AND METHODS FOR PROVIDING ENUM IN AN LNP ENVIRONMENT

This application is a continuation of U.S. patent application Ser. No. 10/971,026, filed Oct. 25, 2004, now U.S. Pat. No. 7,627,108, the content of which is incorporated by reference herein in its entirety.

BACKGROUND OF THE INVENTION

1. Field of Invention

This invention relates to providing systems and methods for utilizing local number portability (LNP) features to implement telephone number mapping (ENUM—tElephone NUmber Mapping).

2. Description of Related Art

ENUM establishes a way to link telephone numbers to the Global Internet. This concept can provide a way to reach multiple communication services using a single phone number. For example, one telephone number can provide a means to contact a user via phone, fax, email, pager, mobile phone, SIP (session initiation protocol) telephony address, website or any other resources that can be described by an internet addressing scheme.

ENUM is a standard adopted by the Internet Engineering Task Force (IETF) that uses the domain name system (DNS) to map telephone numbers to web addresses or uniform resource locators (URL) or other final handling or treatments. The goal of the ENUM standard is to provide a protocol which will provide for single number access to replace multiple numbers and addresses for an individual'. Handling treatments can include terminations to home phone, business phone, fax, cell phone, email and other communication devices.

ENUM is a convergence of the PSTN (public switched telephone network) and IP (internet protocol) networks. This method involves the mapping of a telephone number from the public switched telephone network to internet functionalities.

The E.164 standard details the components of the numbering structure and digits required to successfully route calls through the PSTN. For example, using a ten digit NANP (North American Numbering Plan) telephone number as an example (1-404-123-4567), the ENUM numbering scheme converts the number into a DNS entry as 7.6.5.4.3.2.1.4.0.4.1.e164.arpa.

One of the key functions of the ENUM protocol is the indication of naming authority pointer records (NAPTR) that define the service field options that can be associated with a particular telephone number. When an ENUM enabled phone call is placed, a session is initiated through the IP network to the ENUM Server. A lookup is performed in the ENUM registry database where an authoritative name server is then defined via the NAPTR information attached. The seamless end-point indicated by the NAPTR can lead to a telephone device, fax machine web site, cell phone, or email address as defined by the host party of the telephone number.

In the current communications environment, it will thus be appreciated that local number portability (LNP) allows customers to keep the same telephone number as they change service providers and technologies.

In the wireless and wire-line environments, LNP makes available Service Provider Portability (SPP), which allows the customer to change wireless/local service providers while retaining the same telephone number. For instance, one could switch wireless phone carriers (from Verizon to Cingular) without a change in their number. In addition, Service Provider Portability allows a user to be initially issued a landline number and later transfer that number to a wireless phone upon establishing a wireless account; or vice versa.

In addition to Service Provider Portability, LNP also provides Service Portability, which means that the type of service (i.e., plain old telephone service (POTS) to integrated service digital network (ISDN) service) can be changed without changing the user's telephone number.

With the implementation of the ENUM and LNP services, the telephony world has become extremely robust and adaptable to the changing needs of customers. However, because of their current implementations, there are many additional advantages inherent to each of them that could be further advanced should a system and method be devised that could efficiently provide the ENUM specification in an LNP (POTS) environment.

The current methods used to provide an ENUM specification in the LNP (POTS) environment is cumbersome and inefficient. In the examples disclosed herein, it should be appreciated that the terminating office uses a different LSP (local service provider) than the originating office. Otherwise, the originating office could be directly connected to the LSP of the terminating office if a call was placed intra-LATA (local area transport).

As shown in FIG. 1 and in accordance with the prior art, a call is placed from the originating telephone 105 to the terminating telephone 140. The call is initially forwarded to an originating office 110. Upon receipt of the call, the originating office 110 performs digit analysis on the dialed digits to determine how to route the call. A portion of this digit analysis can compare the dialed number against a routing table. The routing table contains information that indicates whether the dialed number is portable or direct dialed. The routing table indicates the preferred switching sequence to which the call is then routed. Of course, the actual switching sequence used may be altered due to technical problems along the sequence (for example, extremely high call volume, inoperable equipment, etc.)

If the dialed number is listed in the routing table as direct dialed, the call is sent directly from the originating office 110 to the terminating end office 125 through the switching sequence indicated by the routing table. At the terminating end office 125, a request is sent to a media gateway 130 to determine which NAPTR functions are available for that number. Based on the available functions, the call is forwarded to the appropriate server, reformatted, and sent to the telephone 140 or another designated device, such as an IP phone or a voicemail platform. It should be appreciated that the telephone 140 is only exemplarily depicted and can be any device addressable by the functions defined by the NAPTR entry. More particularly, the telephone 140 can be any device capable of being addressed using an internet addressing scheme, including a POTS telephone, an IP phone, fax, email, pager mobile phone, SIP (session initiation protocol) phone, or web server (website). Thus, the format of the call can then be amended according to the type of device the telephone 140 is.

If the called number is deemed portable and the terminating end office 125 does not reside on the switch controlling the originating office 110, the originating office 110 sends an LNP request across the STP (signal transfer point) 115 to the LNP database 120 based on the dialed digits. A lookup is performed at the LNP database to determine the appropriate routing sequence for the portable number and LNP database returns the response to the originating office 110 to handle the call based on the returned response. Once the call is handled based on the response, the call is routed and received at the terminating end office where an ENUM lookup is performed as described above. Subsequently, the call-flow continues to connect the call.

With the current method, numerous steps that are performed could be combined to free system resources and load. With the current configuration and its many steps, numerous steps and system resources could cause problems. Thus, the inventors have discerned that there is a need to merge these technologies in manner that they could be implemented together while efficiently providing the seamless advantages of ENUM and the versatility of LNP.

SUMMARY OF THE INVENTION

One benefit of this invention is to provide a system for providing an ENUM specification in an LNP environment where an originating device of a first service provider dials a dialed call for forwarding to a terminating device of a second service provider. In the system, an originating office of the first service provider receives the dialed call from the originating device. A terminating office of the second service provider, which may be separate from the first local service provider, is where the dialed call is directed by the originating office for connection to the terminating device. The system also includes a combined LNP and ENUM database which is in communication with both the originating office and the terminating office. An originating means for looking up and using LNP and ENUM information from the combined database is then located at the originating office; and a terminating means for looking up and using LNP and ENUM information from the combined database is also located at the terminating office.

In the illustrated embodiment, the originating office includes an LNP capable central office which includes an LNP application and a routing table for portable and non-portable numbers. Preferably, the database is connected to the LNP central office via an STP, and the originating office further includes an originating end office.

In another embodiment, the system further includes a media gateway to which the terminating office and the database are connected.

It is also a benefit of the present invention to provide a method for utilizing local number portability features to implement telephone number mapping. This method utilizes a combined LNP and ENUM database which is provided at a centralized location for ready access by a first local service provider and a second local service provider. In this method, dialed digits, including a terminating exchange of the second local provider, of a dialed call having IP type call data are received from an originating telephone at an originating office of the first local service provider for forwarding to a terminating office of the second local service provider associated with the terminating exchange. A digit analysis of the dialed digits is then performed to determine that the dialed call is directed to an IP device and that the terminating exchange of the dialed call is marked portable. Next, a query is sent to the LNP and ENUM database based on the dialed digits to determine an LRN for the terminating exchange and ENUM information for the IP device. Finally, the dialed call is routed to the IP device in accordance with the LRN and ENUM information obtained from the LNP and ENUM database.

The performing and sending steps are made by the originating office; and the routing step includes the steps of routing the dialed call and ENUM information to the terminating office by the originating office, and routing of the dialed call by the terminating office to the IP device. In addition, the performing a digit analysis step includes the steps of receiving the dialed call at an originating end office of the originating office and forwarding the dialed call to an LNP central office of the originating office, and determining at the LNP central office that the terminating exchange of the dialed call is portable. Further, the sending a query step includes the step of sending of a query by the LNP central office to the database to determine the LRN and ENUM information.

Also in the preferred method, the performing, sending and routing steps can also be made by the terminating office. Preferably, the performing a digit analysis step includes the steps of receiving the dialed call at the originating office and forwarding the dialed call to the terminating office which performs the digit analysis, and determining at the terminating office that the terminating exchange of the dialed call is portable. In addition, the sending a query step includes the step of transferring the dialed call from the terminating office to a media gateway associated therewith, and sending of a query by the media gateway to the database to determine the LRN and ENUM information. Finally, the routing step includes the step of routing the dialed call by the media gateway to the IP device.

As a further benefit, the provisioning for an ENUM enabled customer can be integrated into a single provisioning stream in the LNP/ENUM server (database).

Other objects and features of the present invention are stated in or apparent from detailed descriptions of embodiments of the invention found hereinbelow.

BRIEF DESCRIPTION OF THE DRAWINGS

Various exemplary embodiments will be described in detail, wherein like reference numerals refer to identical or similar components or steps, with reference to the following figures, wherein.

DETAILED DESCRIPTION OF EXEMPLARY EMBODIMENTS

Figure 1:
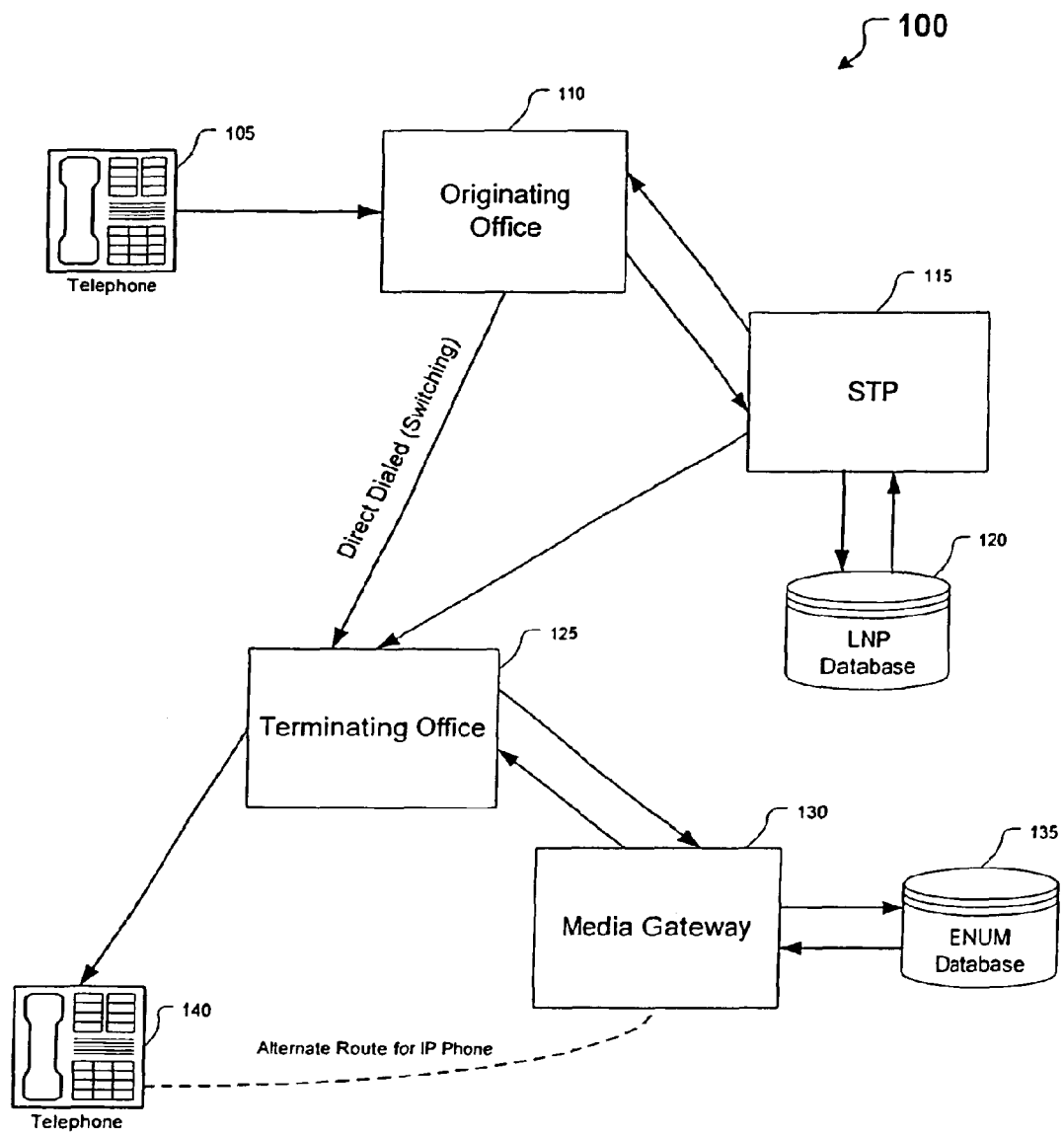
FIG. 1 illustrates a conventional system for providing ENUM in an LNP environment.

Methods and systems for providing an ENUM specification in an LNP environment are described hereafter. In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form rather than detail, in order to avoid obscuring the present invention.

This invention should not be construed as limited to the embodiments set forth herein. Rather, these embodiments are provided so that this disclosure will fully convey the scope of the invention to those skilled in the art. In the drawings, like numbers refer to like elements throughout.

It also will be understood that, as used herein, the term "comprising" or "comprises" is open-ended, and includes one or more stated elements, steps and/or functions without precluding one or more unstated elements, steps and/or functions.

The present invention is described below with reference to block diagrams and/or operational illustrations of methods and wireless terminals according to embodiments of this invention. It is understood that each block of the block diagrams and/or operational illustrations, and combinations of the blocks in the block diagram and/or operational illustrations, can be implemented by radio frequency, analog and/or digital hardware, and/or computer program instructions. These computer program instructions may be provided to a processor of a general-purpose computer, special purpose computer, ASIC (application-specific integrated circuit), and/or other programmable processing apparatus; and these computer program instructions create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or possibly inversely.

Figure 2:
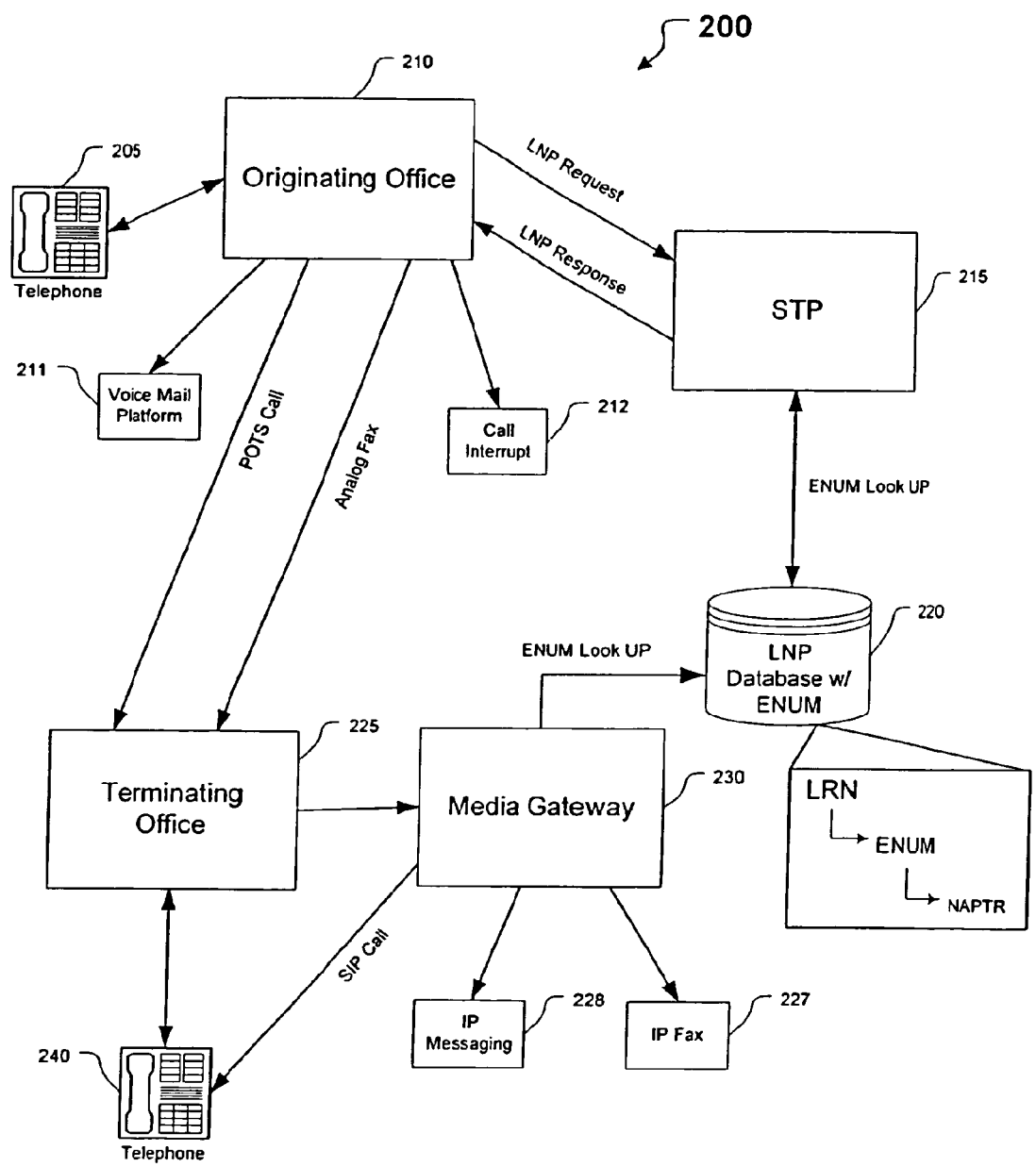
FIG. 2 illustrates a system for providing ENUM in an LNP environment according to an embodiment of this invention.

FIG. 2 illustrates an exemplary embodiment of a system 200 for providing ENUM in an LNP environment according to this invention. As shown in FIG. 2, an LNP/ENUM database 220 has been provisioned with the information of both an LNP database and an ENUM database. Thus, relative to the prior art system of FIG. 1, the information in the LNP database 120 and in the ENUM database 135 have been combined in the LNP/ENUM database 220 of FIG. 2. This configuration provides a centralized location for this combined database information which can serve both the originating office and terminating office. Having a centralized location removes many of the steps required in the conventional processes such as that of FIG. 1. Thus, the load on the system resources is greatly reduced.

As shown in FIG. 2, the originating phone 205 is connected to the originating office 210, such that when a call is placed at the originating phone 205, it is processed at the originating office 210. It should be appreciated that, for illustrative purposes, the exchange and switching devices common to telecommunications system are described and used herein interchangeably with the originating office 210 and the terminating office 225.

In the ENUM environment call process, there are two possible basic types of call data output from an originating telephone 205. The first call data output type is a POTS (plain old telephone system) type and the second call data output type is an IP (internet protocol) type. It is possible to have an individual call utilize both types of call data output, and in an ENUM environment it is expected that the call will normally originate from a POTS terminal with the destination terminal in the IP environment.

Within the IP types of calls, there are two basic paths for call connection as known in the art, those connected from the originating office and those connected from the terminating office. The first path occurs when the originating office 210 retrieves ENUM information at the originating office 210 through the STP, as the originating switch has a table of numbers including those that the originating office directly accesses and those that do not reside within the span of control of the originating office 210. Thus, the choice of routing is initially determined by whether the originating office 210 has direct access. Where the originating office has direct access, the originating office 210 will additionally then determine whether the originating office has the capabilities of IP interface to react to the response from the ENUM directed termination. If the originating office does have the capability of final handling an IP interface, the originating office 210 will handle the call; while if the originating office 210 does not have the capability, then the terminating office 225 will be required to handle the call for final processing. As typical in the art, geographic considerations will also apply. Thus, if the called number would require intertoll (long distance), then the originating office 210 recognizes this from its internal tables and routes the call to an IXC (interexchange (long distance) carrier). The IXC would then perform the LNP dip (?) prior to handing the call to the terminating office 225. Where the second path to the terminating office is chosen, a look up at the ENUM/LNP database 220 occurs from there. It will be appreciated that the second path type typically involves a call that has been directly sent to the terminating office without first performing an ENUM lookup at the originating office.

The following descriptions will be directed towards the IP type call data, where the origination is in the POTS environment.

In the first IP call path type, upon placing a call at the originating phone 205, the originating office 210 performs a digit analysis from the associated table of numbers on the dialed digits to determine how to route the call. For example, the digit analysis may determine that the termination telephone/terminal 240 is a POTS device. If it is indicated by the digit analysis in the originating switch that the terminating telephone/terminal 240 is a POTS device, the call is directly connected (in the case of same serving office) or immediately routed to the appropriate switch(es) to connect the call. However, if the originating office digit analysis determines that the digits indicate an IP terminating device, the call is then handled as an IP call. As an IP call, the originating office also determines if the terminating exchange in the terminating office 225 does not reside on the originating switch and if the terminating exchange is marked portable.

For an IP call, the originating office 210 has what is broadly referred to herein as an originating means that encompasses those elements that then send an LNP query or request based on the dialed digits to the LNP/ENUM database 220 through the STP 215. The LNP/ENUM database 220 returns an LNP response containing the LRN (location routing number, for example 404-236-XXXX) of the recipient switch (terminating office/exchange) to the originating means. The LRN returned can indicate that the recipient switch (or device) has either a POTS format or an IP format. Should the LRN indicate a POTS format, the call is directly connected or a normal POTS routing takes effect. However, if the LRN indicates that the recipient switch (or exchange) is an IP device, in addition to the LRN, the LNP Database 220 also returns the ENUM information included in the NAPTR records to the originating means.

For an IP device, the originating means of the originating office 210 then receives the LNP/ENUM response and analyzes the data. The NAPTR records therein indicate what information format the telephone/terminal 240 or the terminating office 225 can receive. For example, the terminal 240 can be a POTS or an IP device. In the case of POTS termination, the LRN is translated in the originating switch routing tables and an ISUP (integrated services digital network user part) switching sequence routes the call from the originating office to the terminating office.

The terminating office receives and processes the contents of the received information. If the terminating office then determines that the LRN is received and that the GAP (Generic Address Parameter) parameter belongs to a termination point served by this office, that number is processed in the receiving office for allowed/contracted features and services. If the services for this termination point include ENUM service, the terminating office 225 interrogates the ENUM/LNP database content to identify the terminating entity (telephone 240) and delivery method. The terminating switch then completes the call from telephone 205 to telephone 240 as described in the following paragraph.

In the second IP call path type, upon placing a call at the originating phone 205 and making the initial determinations as noted above, the call data is transferred directly to the terminating office 225 without performing a data type analysis. Upon receipt of the call data, the terminating office 225 performs a digit analysis on the dialed digits (as described above for the originating office) to determine how to route the call. If the digit analysis indicates that the call data is in a POTS format, the call data is processed and sent directly to the telephone 240. Otherwise, if the digit analysis determines that the call data is in an IP format, the call is, by what is broadly referred to herein as a terminating means that encompasses those elements needed, transferred to media gateway 230 and an ENUM look up is then performed in the LNP/ENUM database 220. In response to the ENUM look up, the LNP/ENUM database returns the ENUM information including the NAPTR information to the terminating means. Based on the returned NAPTR information, the call is processed by the media gateway 230 and connected to the appropriate receiver or terminal. For example, an SIP call can be connected to the telephone 240.

Figure 3:
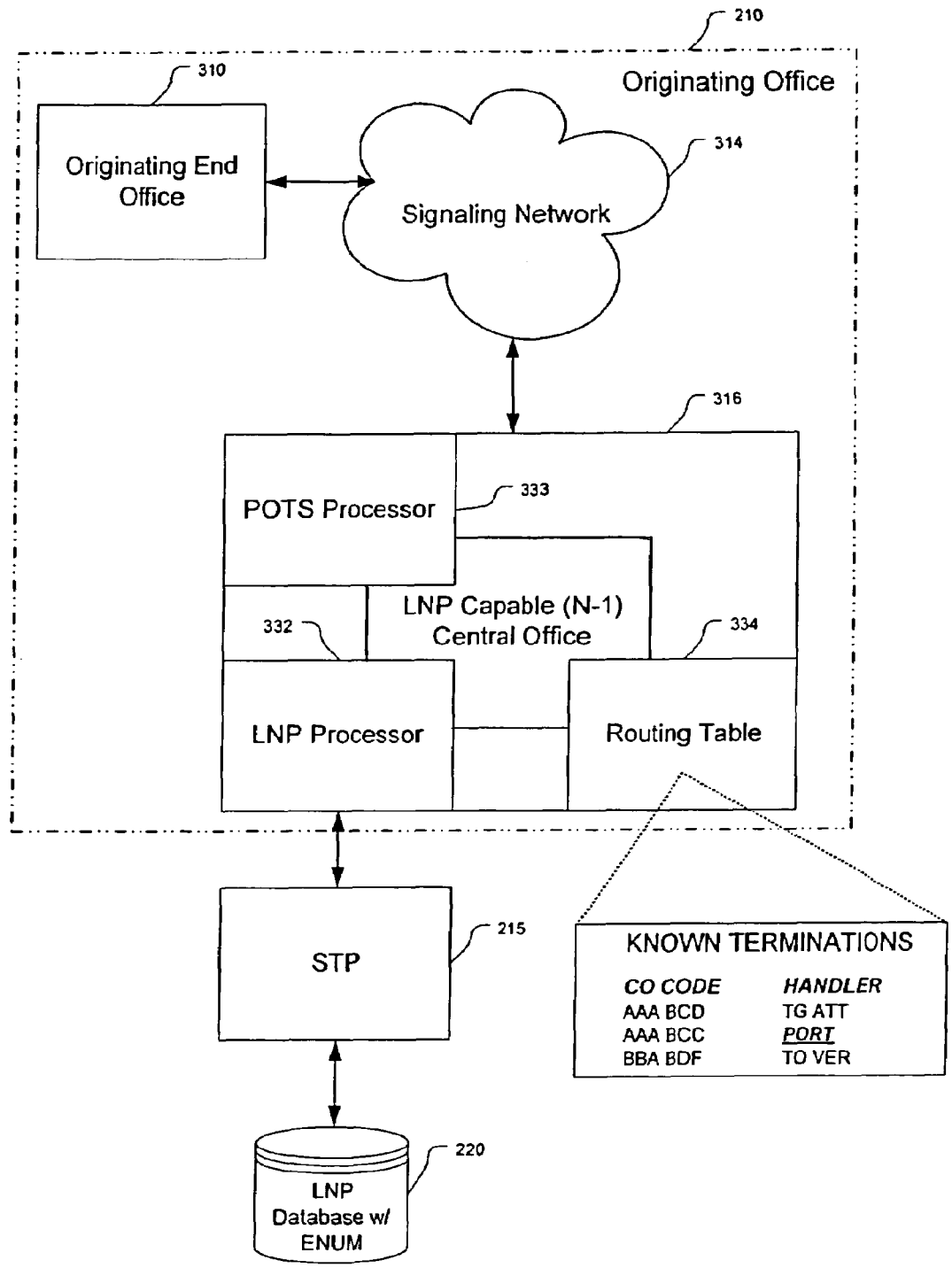
FIG. 3 illustrates an expanded view of the originating office according to an embodiment of this invention.

FIG. 3 illustrates an expanded view of the originating office 210. Contained in the originating office 210 are the originating end office 310, the signaling network 314, and the central office 316.

Figure 4:
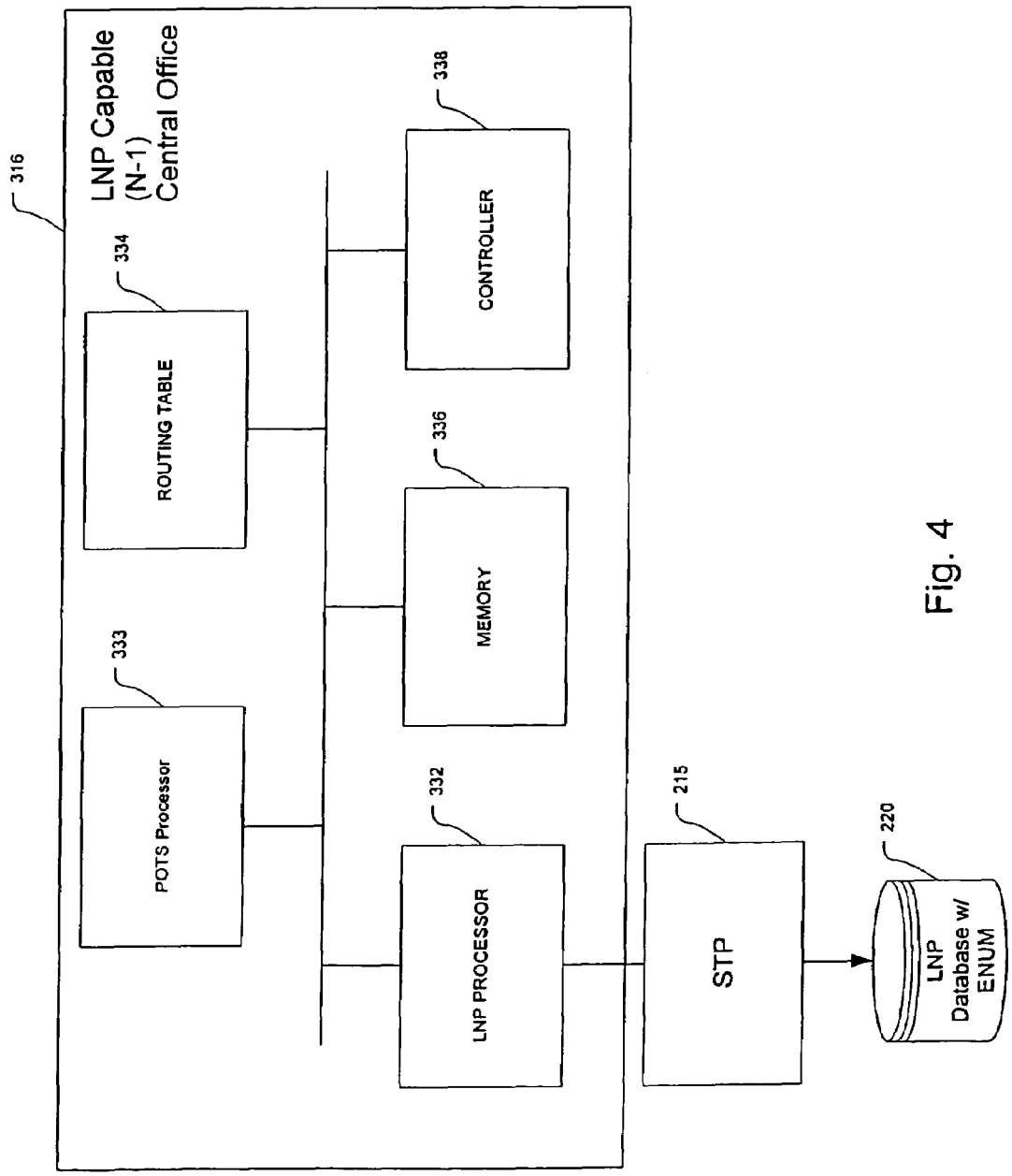
FIG. 4 illustrates an expanded view of the LNP capable central office of FIG. 4.

The central office 316, as shown in greater detail in FIG. 4, is provisioned with LNP capabilities. The central office 316 can be a single office or a multiplicity of offices that lead to the office that is directly down the line (N−1) from the terminating office or the service platform being designated by dialed call data. The central office 316 also contains additional switching equipment and exchanges for connecting subscribers to each other, locally and long distance.

The originating end office 310 can be any central office to which a telephone subscriber is connected, such as a Class 5 office. The originating end office 310 can also be the last central office before the subscriber's phone equipment and which actually delivers the dial tone to the subscriber.

As shown in FIG. 4, the central of 316 contains a POTS application preferably as part of a POTS processor 333, an LNP application preferably as part of a POTS processor 332, and a routing table 334. In addition, as typical in the art, central office 316 also includes a memory 336 and a controller 338 which are all connected together.

The POTS processor 333 can be any device capable of providing signaling to basic service single line telephones, telephone lines and access to the public switched network. Upon determination that the incoming call data is in a POTS format, the POTS processor 333 receives the data, performs any necessary conversions and proceeds to directly connect the call as indicated by the instructions of the incoming/origination call data.

The LNP processor 332 can be any device capable of performing an LNP lookup, receiving and deciphering LNP responses, and handling call data based on the returned response. The LNP processor 332 handles all incoming calls.

The routing table 334 is a user definable list of steps that are treatment instructions for calls. As shown in FIG. 3, the routing table 334 includes a listing of known terminations (instructions) for dialed prefixes. For example, when the prefix "404-236" is dialed, the handler instruction indicates that the number is a POTS type call and directs the central office 316 to route the call to the responsible carrier's trunk group through the POTS processor 333. If the prefix "404-758" is dialed instead, the handler instruction indicates that the number is portable and this call will be routed to the LNP processor 332. There, an LNP/ENUM lookup will be performed through the STP 215 at the LNP/ENUM database 220.

For incoming calls, these steps should be addressed and the call treatment begun before the call is answered by the terminating office. The routing table 334 consists of the steps that include agent groups, voice response devices, announcements (delay and informational), music on hold, intraflow steps, and route dialing (machine based call forwarding). For outgoing calls, the routing table provides the long distance routing choices for each location to be dialed.

Figure 5:
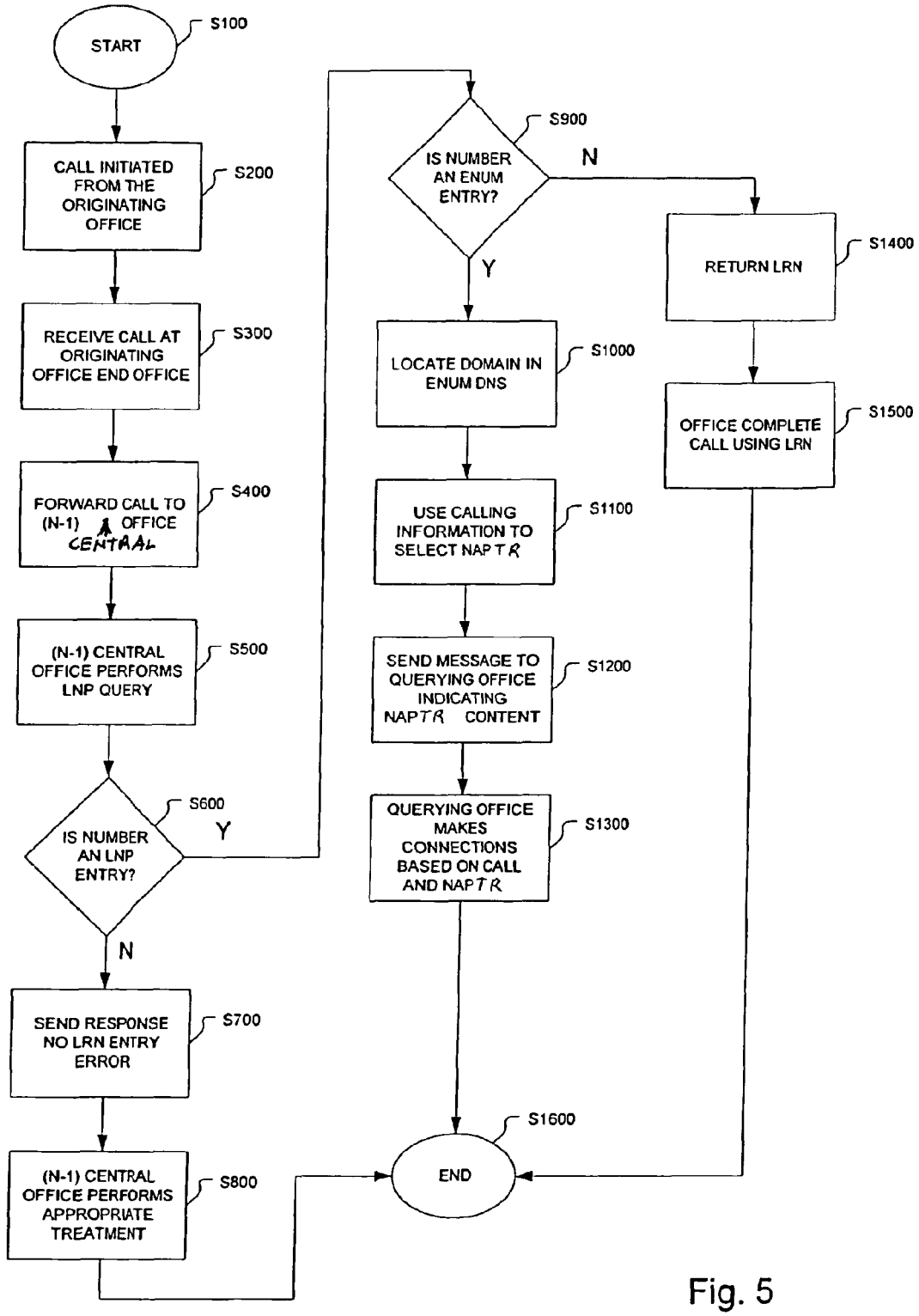
FIG. 5 illustrates a first exemplary method for providing ENUM in an LNP environment.

In operation, the process for the first IP call path type as described above with reference to FIGS. 2-4 is depicted as a block flow diagram in FIG. 5. Thus, upon placing a call as shown as start step S100 at the originating phone 205, the originating office 210 determines at step S200 that the call is initiated from the originating office 210 and in step S300 that the call was received at the originating end office 310 associated therewith. The originating office 210 via LNP capable (N−1) central office 316 at step S400 then performs with LNP capable (N−1) central office 316 a digit analysis on the dialed digits to determine how to route the call. If the digit analysis determines that the telephone 240 is a POTS device, the call is directly connected or immediately routed to the appropriate switches to connect the call using POTS processor 333. However, if the LNP capable (N−1) central office 316 of the originating office 210 determines that the dialed digits indicate an IP device, the call is then handled as an IP call. As an IP call, the LNP capable (N−1) central office 316 of the originating office then determines if the terminating exchange in the terminating office 225 does not reside on the originating switch, and if the terminating exchange is marked portable.

Next, the originating office 210 at step S500 sends an LNP query based on the dialed digits to the LNP/ENUM database 220 through the STP 215. As shown at step S600, the LNP/ENUM database 220 returns an LNP response containing the LRN (location routing number, for example 404-236-XXXX) of the recipient switch (terminating office/exchange). The LRN returned can indicate that the recipient switch (or device) has either a POTS format (NO—thus leading to branch N) or an IP format (YES—thus leading to branch Y). Should the LRN indicate a POTS format, then at step S700 this response is noted and at step S800 the call is directly connected or a normal POTS routing will take effect; after which this portion of the processing ends at step S1600. Of course, if the LRN indicates that the recipient switch (or exchange) is an IP device (branch Y), then a further query is made as shown at step S900 to determine whether there is an ENUM entry as well. If the query at step S900 indicates that there is no ENUM entry, branch N (NO) is taken and as shown at step S1400 the routing table 334 of LNP central office 316 is used to provide the LRN so that the LRN is in turn used to complete the call at step S1500 so that this processing ends at step S1600.

If the query at step S900 indicates that there is an ENUM entry, branch Y (YES) is taken and as shown at step S1000 the domain of the ENUM DNS (domain name systems) is also determined in database 220. From there, the calling information in then used in step S1100 to select the associated NAPTR records. The originating office 210 then receives the LNP response and the NAPTR records from the LNP database 220, which NAPTR records indicate what information format the telephone 240 or the terminating office 225 can receive. For example, the telephone 240 can be a POTS or an IP device. The LRN is thus translated in the LNP routing tables 334 and an ISUP switching sequence route from the originating office to the terminating office is determined. The call with the NAPTR entry is then routed at steps S1200 and S1300 from the originating office 210 to the terminating office 225 based on the determined route and this processing ends at step S1600.

As noted above, after step S1600, the terminating office receives and processes the contents of the received information. The terminating office then determines that the LRN is received and that it belongs to this LRN. The terminating office 225 interrogates the IP content to identify the terminating entity (telephone 240). Finally, a digit analysis is performed and the terminating office finds the appropriate device (i.e., telephone 240) on its network. The terminating switch then completes the call from telephone 205 to telephone 240.

Figure 6:
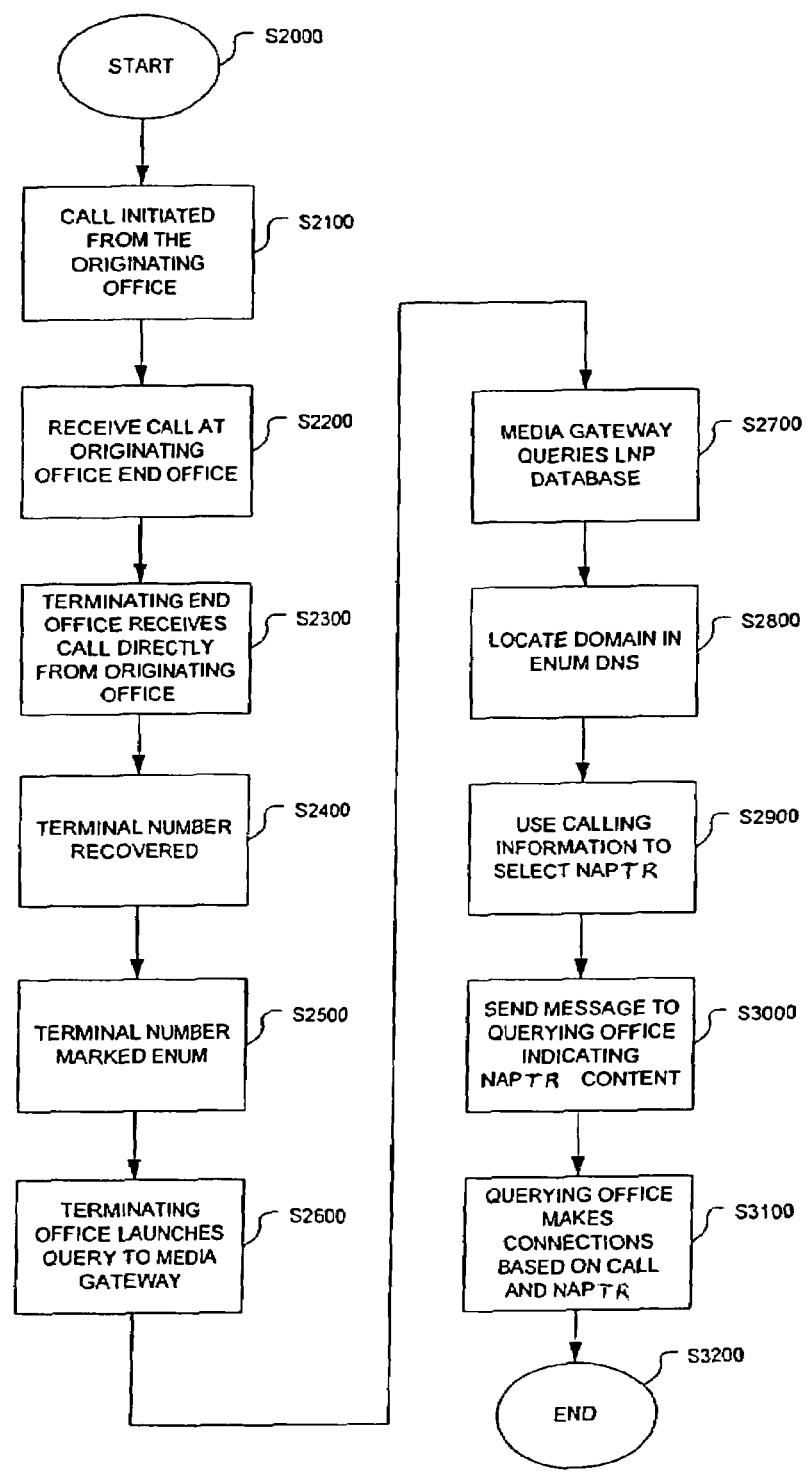
FIG. 6 illustrates a second exemplary method for providing ENUM in an LNP environment.

In operation, the process for the second IP call path type as described above with reference to FIGS. 2-4 is depicted as a block flow diagram in FIG. 6. Thus, in a manner similar to the first IP call path discussed in FIG. 5, upon placing a call as shown as start step S2000 at the originating phone 205, the originating office 210 determines at step S2100 that the call is initiated from the originating office 210 and in step S2200 that the call was received at the originating end office 310 associated therewith. Next, but contrary to the first IP call path, the call data is transferred directly at step S2300 to the terminating office 225 without performing a data type analysis. Upon receipt of the call data at step S2400, the terminating office 225 performs a digit analysis on the dialed digits to determine how to route the call and as shown at step S2500 whether the call has an IP format. If the digit analysis indicates that the call data is in a POTS format, the call data is processed as such and sent directly to the telephone 240.

However, if the digit analysis at step S2500 determines that the call data is in an IP format, the call is transferred to the media gateway 230 at step S2600 and an ENUM look up is performed in the LNP database 220 as schematically shown in steps S2700, S2800 and S2900. In response to the ENUM look up, the LNP/ENUM database returns the ENUM information including the NAPTR information as shown in step S3000. Based on the returned NAPTR information, the call is processed by the media gateway 230 and connected at step S3100 to the appropriate receiver so that this processing thus ends at step S3200. For example, a SIP call can be connected at step S3100 to the telephone 240.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A system for providing ENUM in an LNP environment, the system comprising:
    an originating office of a service provider;
    a terminating office in communication with the originating office; and
    a combined LNP and ENUM database in communication with the originating office and the terminating office,
    wherein the originating office receives a call placed by an originating device to a terminating device, the originating office queries the combined LNP and ENUM database based upon dialed digits of the call with a single query, the combined LNP and ENUM database returns a single response, the single response containing LNP information when the terminating device is a POTS device and LNP and ENUM information when the terminating device is an IP terminating device, and the originating office analyzes the single response to determine how to route the call, the call being directly connected to the terminating device through the terminating office if the terminating device is the POTS device, and wherein if the terminating device is the IP terminating device, the originating office receives the single response including LNP and ENUM information, and handles the call according to the response from the combined LNP and ENUM database.

2. The system of claim 1, wherein if the originating office is not capable of handling the call, the terminating office handles the call.

3. The system of claim 1, further comprising a signal transfer point (STP) connecting the originating office to the combined LNP and ENUM database.

4. The system of claim 3, wherein the originating office retrieves ENUM information through the STP.

5. The system of claim 4, wherein the response contains a location routing number (LRN) of the terminating office.

6. The system of claim 5, wherein the LRN in the response indicates that the terminating office has one of a POTS format and an IP format.

7. The system of claim 6, wherein if the LRN in the response indicates that the terminating office is the IP format, the combined LNP and ENUM database returns ENUM information with the LRN in the response.

8. The system of claim 7, wherein the response further includes naming authority pointer (NAPTR) records from the combined LNP and ENUM database.

9. The system of claim 8, wherein NAPTR records in the response indicate an information format that the terminating office can receive.

10. A system for providing ENUM in an LNP environment, the system comprising:
    an originating office of a service provider;
    a terminating office in communication with the originating office; and
    a combined LNP and ENUM database in communication with the originating office and the terminating office,
    wherein the originating office receives a call placed by an originating device to a terminating device, the originating office directly connects the call to the terminating office, the terminating office queries the combined LNP and ENUM database based upon dialed digits of the call with a single query, the combined LNP and ENUM database returns a single response, the single response containing LNP information when the terminating device is a POTS device and LNP and ENUM information when the terminating device is an IP terminating device, and the terminating office analyzes the single response to determine how to route the call, wherein if the terminating device is the POTS device the call is sent directly to the terminating device, and wherein if the terminating device is the IP terminating device, the terminating office receives the single response including LNP and ENUM information, and handles the call according to the response from the combined LNP and ENUM database.

11. The system of claim 10, further comprising a media gateway in communication with the terminating office and the combined LNP and ENUM database.

12. The system of claim 11, wherein the media gateway processes the call and connects to the terminating device.

13. The system of claim 10, wherein naming authority pointer (NAPTR) records in the response indicate an information format that the terminating office can receive.

14. A method of providing ENUM in an LNP environment, the method comprising:
receiving a call at an originating office;
sending an LNP query to a combined LNP and ENUM database;
receiving a single response from the LNP and ENUM database, the single response containing LNP information when the terminating device is a POTS device and LNP and ENUM information when the terminating device is an IP terminating device;
analyzing the single response to determine how to route the call;
determining that the call is directed to an IP device; and
routing the call according to the single response.

15. The method of claim 14, further comprising determining the terminating office does not reside on an originating switch.

16. The method of claim 14, wherein the LNP query is sent through a signal transfer point (STP).

17. The method of claim 14, wherein the response includes a location routing number (LRN) of the IP device.

18. The method of claim 14, further comprising determining whether the combined LNP and ENUM database includes an ENUM entry for the IP device.

19. The method of claim 14, further comprising receiving naming authority pointer (NAPTR) records from the combined LNP and ENUM database.

20. The method of claim 19, wherein the NAPTR records indicate an information format the IP device and terminating office can receive.

* * * * *